UNITED STATES PATENT OFFICE.

ALEXANDER SYDNEY RAMAGE, OF CLEVELAND, OHIO.

PIGMENT.

SPECIFICATION forming part of Letters Patent No. 708,584, dated September 9, 1902.

Application filed February 17, 1902. Serial No. 94,471. (No specimens.)

*To all whom it may concern:*

Be it known that I, ALEXANDER SYDNEY RAMAGE, a citizen of the United States, residing at Cleveland, State of Ohio, have invented new and useful Improvements in Pigments, of which the following is a specification.

This invention consists in a pigment produced by precipitating from ferrous liquors a hydrated basic ferric oxid and by subsequently impregnating said oxid with an independent coloring agent. The ferrous liquor which is especially available is the waste solution resulting from the pickling of iron. This liquor commonly contains ferrous sulfate or ferrous chlorid, depending on the acid which has been used in pickling, and may contain a small amount of the free acid. For the production of the yellow oxid the free acid in the pickle liquor, if any, is neutralized by any convenient reagent, such as sodium carbonate. The ferrous salt in solution is then oxidized, preferably by the injection of air or air and steam in a finely-divided condition, being thereby converted into a basic ferric salt. This basic salt is hydrolized by dissolving it in sufficient water to effect decomposition of the salt into its acid and basic ferric hydrate. In order that all of the salt in solution may be thus hydrolized, the resulting acid is neutralized as set free or from time to time, as by the addition of a hydrate or carbonate of an alkali or an alkaline earth metal. The hydrated basic ferric oxid thus precipitated is of bright yellow color and has the composition $Fe_2O_3$, $Fe_2(OH)_6$. This oxid is extremely light, a cubic foot weighing but thirty pounds, and is an impalpable powder of velvety texture. It seems to contain a large amount of occluded oxygen, as shown by the fact that it quickly dries raw linseed-oil. Furthermore, when heated in the absence of air to a temperature sufficient to start the reaction its temperature at once rises to a white heat, this sudden evolution of heat being evidently due to the action of the occluded oxygen. This yellow oxid and the process of producing it are the subjects of my United States Patent No. 691,324. I have now discovered that this oxid has properties which enable it to be used as a base upon which to precipitate independent coloring agents, such as dyes or lakes. The yellow oxid may be impregnated with an organic green by taking ninety-five pounds of the oxid and thoroughly mixing it with water by the use of a sieve, then while keeping the oxid in suspension in the water adding five pounds of naphthol green or acid green in solution, and finally adding an equivalent amount of any well-known precipitating agent, such as basic-lead acetate or barium chlorid. For the production of a brilliant and permanent inorganic yellow ninety-five pounds of the yellow iron oxid are suspended in water, five pounds of potassium bichromate in solution added, and lead chromate precipitated on the iron oxid by the addition of lead acetate in excess. The iron oxid may be impregnated with Berlin blue by suspending ninety-five pounds of it in water, adding five pounds of ferric chlorid, and finally adding an equivalent amount of potassium ferrocyanid. A Turkey-red lake may be precipitated upon the iron oxid by first saturating it with a mordant, such as acetate of aluminium or ricinoleic sulfonic acid, and then submerging it in a solution of alizarin. The independent coloring agents thus precipitated on the iron oxid become intimately combined with it and seem to penetrate the particles of oxid. This intimate union, which may be due to the porosity of the ultimate particles of the oxid, gives an exceedingly valuable product, which retains all the desirable physical and chemical properties of the oxid, while presenting to the eye the appearance of the independent coloring agent, which perfectly conceals the oxid beneath. The product, as might be anticipated from the fact that ninety-five per cent. of it, by weight, consists of the oxid, has an absorption of oil three times as great as Rochelle and two and one-half times as great as standard French ocher, also seven and one-half that of white lead and three times that of pure zinc oxid. It has four times the covering power of white lead, twice the covering power of zinc-white, and more than twice the covering power of the finest French ocher. It also retains the property of rapidly drying raw linseed-oil.

I am aware that it has heretofore been proposed to coat the particles of finely-divided mineral substances—such as ground barytes, silica, glass, slag, or rock—with various pigments and coloring agents—such as white lead, zinc-white, or iron oxid. Such products are unsatisfactory, however, as the body or base proper and the coloring agent are in separate particles of various sizes and irregularly intermingled. Such portions of the coloring agent as may adhere to particles of the base are loosely held. I am also aware that it has been proposed to coat the particles of ground mica or talc with water-colors or varnish-colors, the glue or varnish being relied on to hold the coating in place on the smooth surface of the particles. My product is entirely distinct from such prior art by reason of the physical properties of the oxid, which, as set forth above, enable it to become impregnated with and permanently retain the coloring agent while still possessing the lightness, velvety texture, covering power, and capacity for absorbing and drying oil peculiar to the oxid itself.

I claim—

A pigment consisting of the light, yellow, hydrated basic, ferric oxid, having the formula $Fe_2O_3Fe_2(OH)_6$, impregnated with an independent coloring agent, as set forth.

In testimony whereof I affix my signature in presence of two witnesses.

ALEXANDER SYDNEY RAMAGE.

Witnesses:
A. T. HATCH,
W. S. ROGERS.